United States Patent
Miyauchi et al.

(10) Patent No.: US 8,177,171 B2
(45) Date of Patent: May 15, 2012

(54) PIPING INSTALLATION STRUCTURE FOR VEHICLE

(75) Inventors: Kunio Miyauchi, Saitama (JP);
Toshifumi Gocho, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 168 days.

(21) Appl. No.: 12/599,924

(22) PCT Filed: May 16, 2008

(86) PCT No.: PCT/JP2008/059025
§ 371 (c)(1),
(2), (4) Date: Nov. 12, 2009

(87) PCT Pub. No.: WO2008/143169
PCT Pub. Date: Nov. 27, 2008

(65) Prior Publication Data
US 2010/0213325 A1 Aug. 26, 2010

(30) Foreign Application Priority Data
May 16, 2007 (JP) .................................. 2007-130250

(51) Int. Cl.
*F16L 3/00* (2006.01)
*F16F 7/00* (2006.01)
(52) U.S. Cl. ..................... 248/62; 248/610; 181/207
(58) Field of Classification Search ................ 248/62, 248/610, 611, 58; 181/207
See application file for complete search history.

(56) References Cited

U.S. PATENT DOCUMENTS

| 3,735,950 | A | * | 5/1973 | Paintin ............................. 248/62 |
| 4,180,228 | A | * | 12/1979 | Snyder et al. ................ 248/74.4 |
| 7,533,853 | B2 | * | 5/2009 | Ogawa ......................... 248/74.1 |
| 2003/0057013 | A1 | | 3/2003 | Uegane et al. |

FOREIGN PATENT DOCUMENTS

| JP | 57-001744 U | 6/1982 |
| JP | 59-121575 U | 8/1984 |
| JP | 62-010155 U | 1/1987 |
| JP | 63-76567 U | 5/1988 |
| JP | 63-76567 U | 5/1988 |
| JP | 02-32461 U | 2/1990 |
| JP | 6-082487 U | 11/1994 |
| JP | 11-093932 A | 4/1999 |

* cited by examiner

*Primary Examiner* — Anita M King
(74) *Attorney, Agent, or Firm* — Carrier Blackman & Associates, P.C.; William D. Blackman; Joseph P. Carrier

(57) ABSTRACT

There is provided a piping installation structure for a vehicle which is installed under a floor of a vehicle body and configured to support and fix a long part including at least piping, the piping installation structure including: a clamp member for supporting and fixing the long part; a stud for fixing the clamp member under the floor of the vehicle body; a stud fixing member to which the stud is fixed; and an underfloor structural member installed under the floor of the vehicle body, in which the stud fixing member and the underfloor structural member are joined to form a closed cross section on a plane which is orthogonal to a front-rear direction of the vehicle body.

6 Claims, 8 Drawing Sheets

PIPING INSTALLATION STRUCTURE FOR VEHICLE

FIELD OF THE INVENTION

The present invention relates to a piping installation structure for a vehicle, which supports and fixes various types of piping, such as fuel piping, under a floor of a vehicle body.

DESCRIPTION OF THE RELATED ART

Conventionally, for example, in a vehicle such as an automobile, fuel piping, brake piping and the like through which a fluid, such as fuel fluid and brake fluid, passes are fixed to a predetermined position under a floor of a vehicle body, using a stud fixture (see, for example, JP 11-093932 A ([0002] and FIG. 6) which is hereby incorporated by reference in its entirety).

For example, in a prior art piping installation structure shown in FIG. 12, a head of a stud bolt having an approximately T-shaped cross section is directly fixed to a lower surface of a vehicle body panel by welding or the like; the stud bolt which had been fixed to the vehicle body panel is inserted into a locking hole formed in a clamp member so as to fix the clamp member to the stud bolt; and various types of piping are held under a floor of a vehicle body in holding portions formed in the clamp member.

However, in the prior art piping installation structure shown in FIG. 12, vibration and noise may occur due to pulsation of fluids passing through the piping held under the floor of the vehicle body, and these vibration and noise may be transmitted to the clamp member holding the piping, to the stud bolt and the vehicle body panel, and then to a driver or passengers.

In order to suppress the transmission of the vibration and noise, it is thought that the stud bolt is not directly fixed to the lower surface of the vehicle body panel, and for example, the clamp member is supported by other members, such as bracket (not shown). However, in order to support the clamp member, it is necessary to ensure a stiffness of the other members, such as bracket.

Therefore, it is desirable to provide a piping installation structure for a vehicle which improves the stiffness of the piping installation part held under the floor of the vehicle body.

Also, it is desirable to provide a piping installation structure for a vehicle which reduces an acoustic sensitivity from the piping installation part held under the floor to the interior of the vehicle body (hereinbelow, referred to as "acoustic sensitivity of installation part").

SUMMARY OF THE INVENTION

Inventors have been dedicated to studying in order to solve the above problems. As a result, the inventors have realized a piping installation structure for a vehicle which improves a stiffness of a piping installation part held under a floor of a vehicle body, and reduces an acoustic sensitivity of an installation part.

[1] That is, in accordance with a first aspect of the present invention, there is provided a piping installation structure for a vehicle which is installed under a floor of a vehicle body and configured to support and fix a long part including at least piping, the piping installation structure including: a clamp member for supporting and fixing the long part; a stud for fixing the clamp member under the floor of the vehicle body; a stud fixing member to which the stud is fixed; and an underfloor structural member installed under the floor of the vehicle body, in which the stud fixing member and the underfloor structural member are joined each other to form a closed cross sectional shape on a plane which is orthogonal to a front-rear direction of the vehicle body.

[2] In accordance with a second aspect of the present invention, there is provided a piping installation structure for a vehicle in which a predetermined clearance is provided between the stud fixing member and a lower surface of the floor of the vehicle body.

[3] In accordance with a third aspect of the present invention, there is provided a piping installation structure for a vehicle in which the underfloor structural member is fixed to the vehicle body, and the stud fixing member is disposed between the floor of the vehicle body and the underfloor structural member.

[4] In accordance with a fourth aspect of the present invention, there is provided a piping installation structure for a vehicle in which the stud fixing member includes a bracket, the underfloor structural member includes a frame member extending in the front-rear direction of the vehicle body and having an opening on a cross sectional plane which is orthogonal to the front-rear direction of the vehicle body, and a closed rectangular shaped cross section is formed by closing the opening of the frame member with the bracket.

[5] In accordance with a fifth aspect of the present invention, there is provided a piping installation structure for a vehicle in which the bracket is double supported by one sidewall portion and the other sidewall portion of the frame member in a width direction of the vehicle body.

The various aspects, other advantages, and further features of the present invention will become more apparent by describing in detail illustrative, non-limiting embodiments thereof with reference to the accompanying drawings.

BEST MODE FOR CARRYING OUT THE INVENTION

Next, embodiments of the present invention will be described below in detail with reference to the accompanying drawings.

First Embodiment

Figure 1:
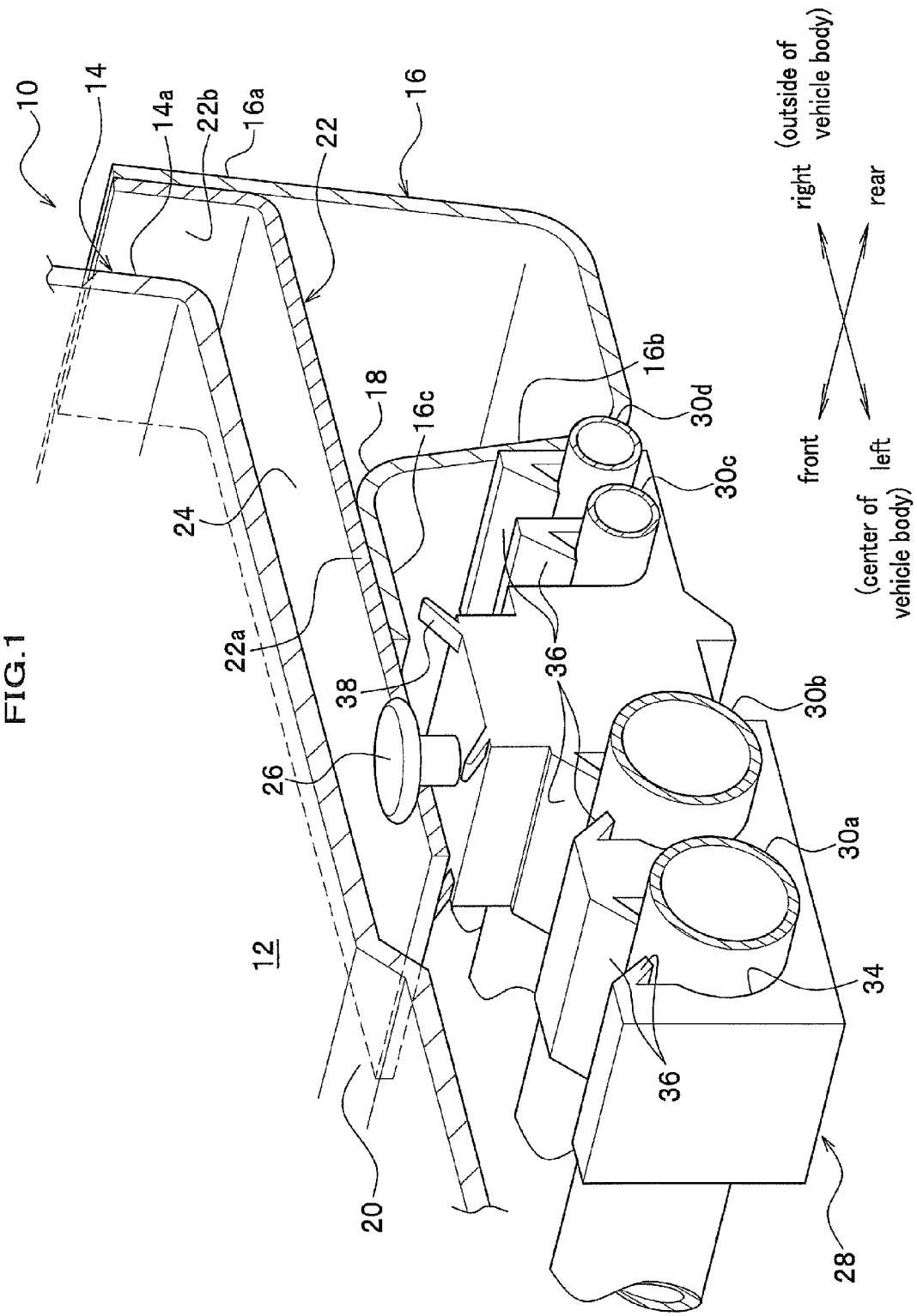
FIG. 1 is a partially cutaway perspective view showing a piping installation structure for a vehicle according to a first embodiment of the present invention.
Figure 2:
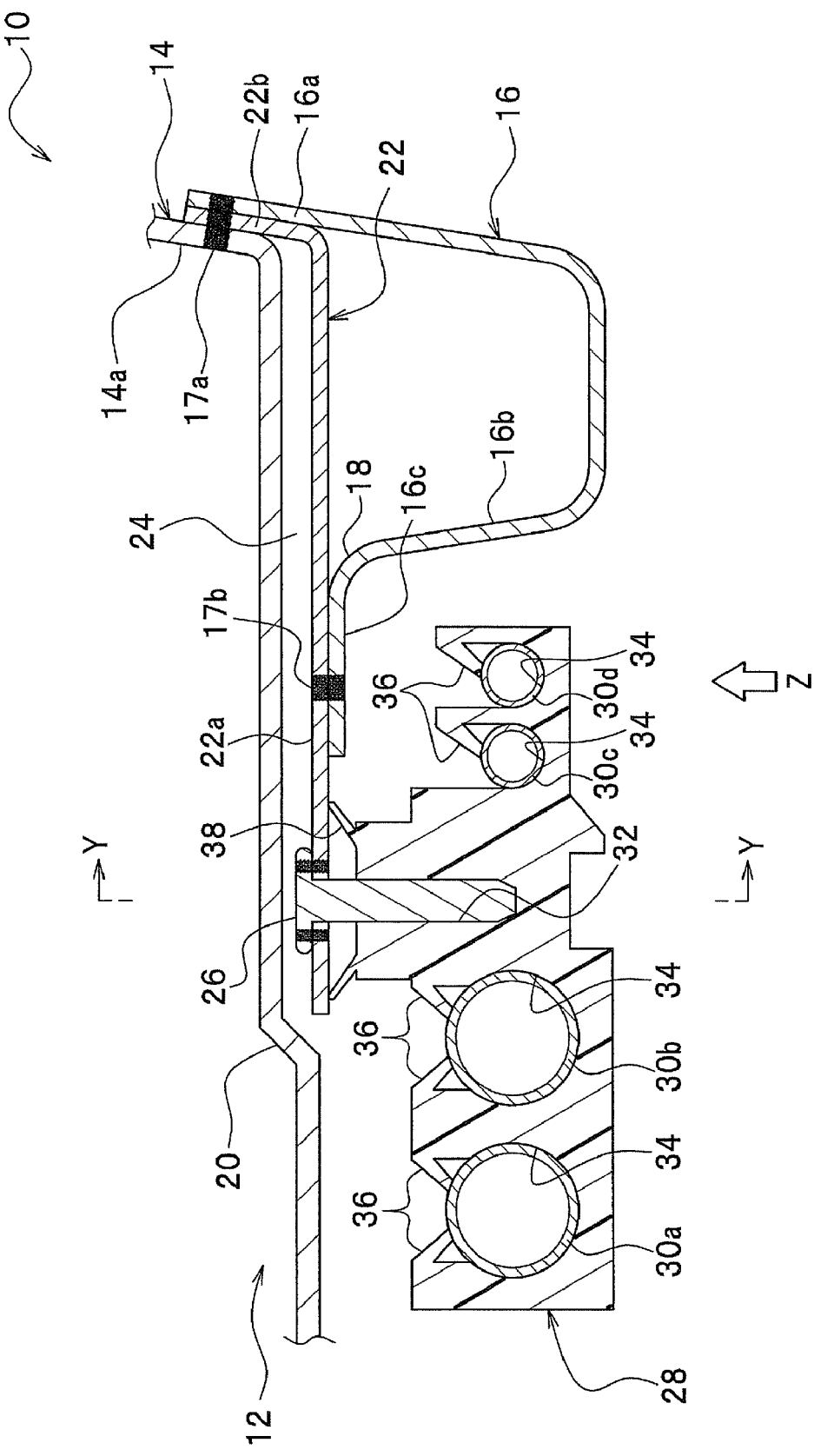
FIG. 2 is a longitudinal sectional view showing the piping installation structure of FIG. 1.

As shown in FIGS. 1 and 2, a vehicle body 10 includes: a floor panel 14 configured to provide a vehicle compartment 12; and two frame members 16 disposed below the floor panel 14 and configured to reinforce floor parts as underfloor structural members (floor frames). The frame members 16 extend in a front-rear direction of the vehicle body 10, and are arranged apart from each other on right and left sides in a vehicle width direction by a predetermined distance (in FIGS. 1 and 2, the frame member 16 of only the right side is shown and the other is omitted). The frame member 16 has an approximately U-shaped cross section orthogonal to a front-rear axis, and an opening 18 directed toward an upside (a floor panel side). In addition, the frame member 16 is integrally joined with the floor panel 14 via joint portions 15 (see FIG. 3B) formed by a joining means, such as spot welding.

As shown in FIG. 2, between the floor panel 14 and the frame member 16, a bracket (stud fixing member) 22, which extends in approximately parallel with a step portion 20 of the floor panel 14 (see FIG. 3B) and closes the opening 18 of the frame member 16, is provided. The bracket 22 is made of a plate having a narrow width, and includes a horizontal portion 22a whose cross section extends by a predetermined length in an approximately horizontal direction orthogonal to the front-rear axis, and a standing portion 22b extending upward and sloping at a predetermined angle along a side wall of the floor panel 14. Between the floor panel 14 and the horizontal portion 22a of the bracket 22, a clearance 24 having a predetermined distance in a vertical direction and extending in an approximately horizontal direction is provided (see FIGS. 2 and 3A).

In this case, a sidewall portion 16a of the frame member 16 locating on an outside in the vehicle width direction is integrally joined with a sidewall portion 14a of the floor panel 14 extending upward, via the standing portion 22b of the bracket 22 by, for example, spot welding. That is, three members including the floor panel 14, the bracket 22, and the frame member 16 (sidewall portion 16a) are integrally joined by a joint means, such as spot welding (see a first joint portion 17a shown in FIGS. 2 and 3B).

The frame member 16 also has the other sidewall portion including: a sidewall portion 16b provided along the vehicle width direction and opposed to the sidewall portion 16a; and a flange portion 16c formed by bending an end portion of the sidewall portion 16b along a lower surface of the bracket 22. The flange portion 16c of the frame member 16 is integrally joined with the lower surface of the bracket 22 by, for example, spot welding. That is, two members including the bracket 22 and the frame member 16 (flange portion 16c) are integrally joined by a joint means, such as spot welding (see a second joint portion 17b shown in FIGS. 2 and 3B).

In this case, the flange portion 16c of the frame member 16 extends in approximately parallel with the lower surface of the bracket 22, and the length along the vehicle width direction, as shown in the vertical cross section of FIG. 2, is made shorter than the length of the bracket 22. In other words, in the vehicle width direction, one end portion of the bracket 22 extends more than one end portion of the frame member 16 by a predetermined length.

The bracket 22 is supported by both the sidewall portion 16a of the frame member 16 and the sidewall portion 14a of the floor panel 14, and the flange portion 16c of the frame member 16, arranged along the vehicle width direction, i.e., the members form a double supported structure. Since the bracket 22 is located between the floor panel 14 and the frame member 16, and the bracket 22 spans the sidewall portion 16a and the sidewall portion 16b to the flange portion 16c of the frame member 16, the stiffness of the bracket 22 can be improved. A plurality of the brackets 22 are arranged at predetermined intervals along the front-rear direction of the vehicle.

In other words, by forming a closed cross section structure (see FIG. 2) in which the opening 18 of the frame member 16 having an approximately U-shaped cross section orthogonal to the front-rear axis is closed with the brackets 22 (a structure in which the opening 18 is partially closed only at the positions where the brackets 22 are disposed), the stiffness of the bracket 22 can be improved.

To one end portion (an extending portion from the flange portion 16c of the frame member 16) of the bracket 22 along the vehicle width direction in the vicinity of the second joint portion 17b of the frame member 16, for example, a stud bolt (stud) 26 having an approximately T-shaped cross section is fixed, and the various types of piping 30a-30d are installed in such a manner that they are supported by a clamp member 28 fixed to the stud bolt 26. In this case, as shown in FIGS. 1 and 2, joining between the bracket 22 and the stud bolt 26 may be attained by suspending a shank of the stud bolt 26 from a hole formed in the bracket 22 and then joining a head of the stud bolt 26 to an upper surface of the bracket 22, by spot welding or the like, or may be attained by integrally joining the head of the stud bolt 26 to the lower surface of the bracket 22 by spot welding or the like.

As the fuel piping, fuel feed piping 30a and vent piping 30b each having a larger diameter and connecting a fuel tank (not shown) located at a rear portion of the vehicle body to an engine (not shown) located in a front portion of the vehicle body are provided. As the brake piping, brake piping 30c, 30d each having a smaller diameter and connecting a brake master cylinder (not shown) located in the front portion of the vehicle body to brakes (not shown) of right and left rear wheels are provided.

These various types of piping 30a-30d are arranged linearly in approximately parallel with an extending direction of the frame member 16, and held by a plurality of the clamp members 28 arranged at predetermined intervals along the front-rear direction, and installed to the frame member 16 by a plurality of the brackets 22 arranged at the same intervals as those of the clamp members 28.

Also, in the clamp member 28, holding grooves 34 each having an approximately U-shaped cross section for holding the piping 30a-30d are formed, and at an opening of the holding groove 34, a single (or a pair of) resilient portion 36 is provided which slopes from an opening edge to a bottom of the holding groove 34.

The resilient portion 36 is pushed open owing to its flexibility when each of the piping 30a-30d is inserted in the respective holding grooves 34, to allow the piping 30a-30d to enter the holding grooves 34 towards the bottom thereof. On the other hand, the resilient portion 36 resumes the initial shape when each of the piping 30a-30d sits in the respective holding grooves 34, to prevent the piping 30a-30d from being detached from the holding grooves 34, and to prevent wobbling of the piping 30a-30d in the holding grooves 34.

In the clamp member 28, a bolt insertion hole 32, into which the stud bolt 26 is inserted, is formed. On an inner wall of the bolt insertion hole 32, a plurality of resilient portions (not shown) which engage with a thread of the stud bolt 26 are formed. The resilient portion deforms outward away from the thread when the stud bolt 26 is inserted, and deforms inward into the thread when a force to pull out the stud bolt 26 is applied to the clamp member 28.

Therefore, a worker can easily install the clamp member 28, even though the various types of piping are held therein, by pushing the clamp member 28 toward the floor panel 14 so as to insert the shank of the stud bolt 26 suspending at the end portion of the bracket 22 into the bolt insertion hole 32 of the clamp member 28. In addition, once the clamp member 28 is installed to the stud bolt 26, the resilient portion engages with the thread of the stud bolt 26 and thus the stud bolt 26 is prevented from being detached.

Further, at an upper portion of the clamp member 28 in the vicinity of the bolt insertion hole 32 into which the stud bolt 26 is inserted, a pair of elastic pieces 38 each made of a thin-walled protrusion may be provided, for example. The elastic piece 38 pushes the lower surface of the bracket 22 owing to its resilient force to prevent wobbling of the clamp member 28, and to keep the engagement state of the resilient portion into the thread of the stud bolt 26 to prevent loosening of the stud bolt 26.

In addition, through holes (not shown) may be made at a middle portion of the floor panel 14 and/or the bottom plate of the frame member 16, for the purpose of draining paint applied during a painting process of the vehicle body 10, or draining water or dust entered in the U-shaped portion of the bracket 22.

The basic configuration of the piping installation structure for a vehicle according to the first embodiment has been described above. Next, the effect of the first embodiment will be described by comparing with Comparative Examples. In addition, in the following Comparative Examples, components which are the same as those of the first embodiment are designated with the same reference characters, and thus a duplicate description is omitted.

Figure 8:
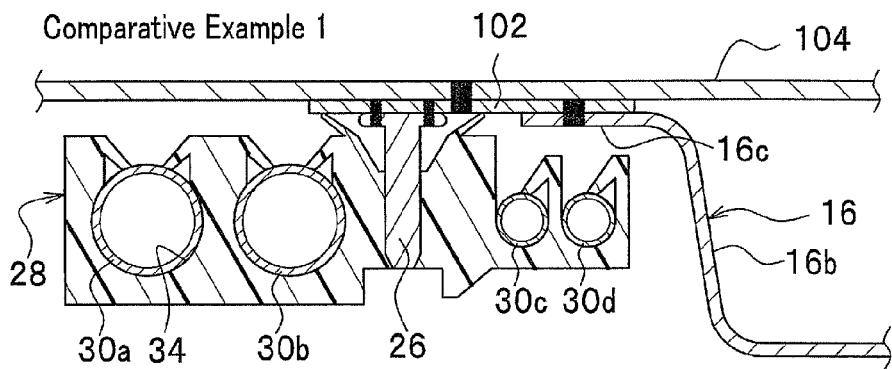
FIG. 8 is a longitudinal sectional view of a piping installation structure according to the Comparative Example 1.

FIG. 8 is a longitudinal sectional view of a piping installation structure according to Comparative Example 1. In Comparative Example 1, in order to ensure a stiffness of a bracket 102, the bracket 102 is fixed to a lower surface of a floor panel 104 by welding or the like, and to the flange portion 16c of the frame member 16 by welding or the like. In this piping installation structure according to Comparative Example 1, vibration and noise generated in the various types of piping 30a-30d are transmitted to the floor panel 104 via the stud bolt 26 and the bracket 102. A structure for cutting off the vibration and noise may be introduced. However, it is not preferable because production cost and weight increase.

Figure 9:
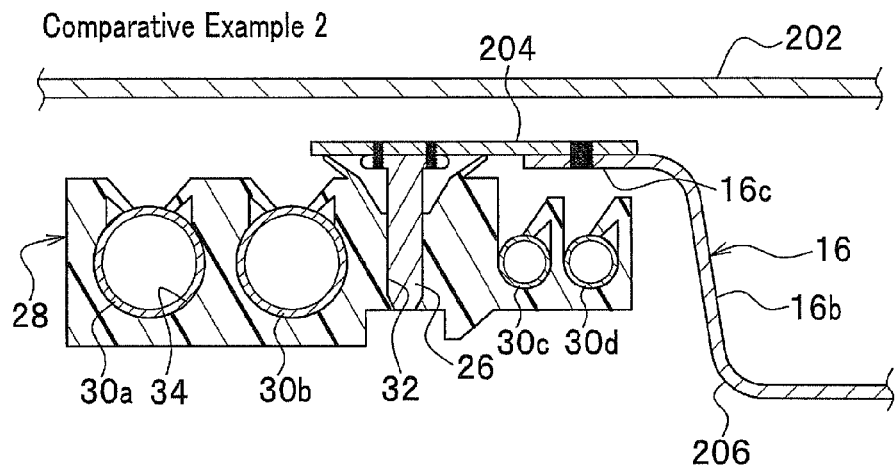
FIG. 9 is a longitudinal sectional view of a piping installation structure according to the Comparative Example 2.

FIG. 9 is a longitudinal sectional view of a piping installation structure according to Comparative Example 2. In Comparative Example 2, in order to reduce transmission of vibration to a floor panel 202, a bracket 204 is supported only by the flange portion 16c of the frame member 16, without fixing the bracket 204 to a lower surface of the floor panel 202. In this piping installation structure according to Comparative Example 2, when the clamp member 28 is pushed to insert the stud bolt 26 into the bolt insertion hole 32, the pressing force is concentratedly applied to a fixing portion between the bracket 204 and the frame member 16, and to a bend portion 206 nearby. As a result, working efficiency for assembling, as well as easiness of assembling, becomes poor, and thus the configuration of Comparative Example 2 is not preferred.

Figure 10:
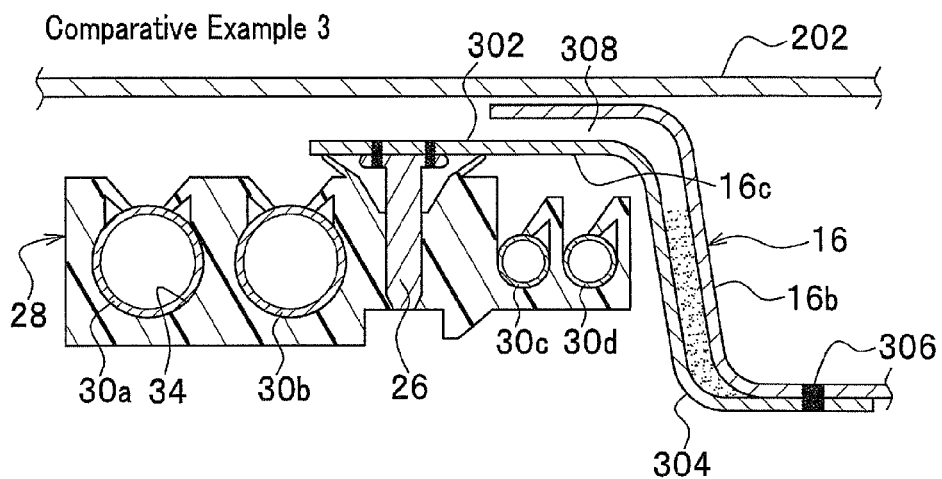
FIG. 10 is a longitudinal sectional view of a piping installation structure according to a Comparative Example 3.

FIG. 10 is a longitudinal sectional view of a piping installation structure according to Comparative Example 3. In Comparative Example 3, one end portion of a bracket 302 is bent in a shape of a crank in a cross section, and a bend portion 304 of the bracket 302 is joined, by welding or the like, with a portion 306 of the frame member 16 which has high stiffness and is capable of reducing vibration and noise. In this piping installation structure according to Comparative Example 3, workability for assembling, and productivity of the bracket 302 become poor due to its shape. Also, rain water, mud or the like enters a clearance 308 between the frame member 16 and the bracket 302, and rust is formed. As a result, the rust reduces durability, and thus the configuration of Comparative Example 3 is not preferred.

Figure 11:
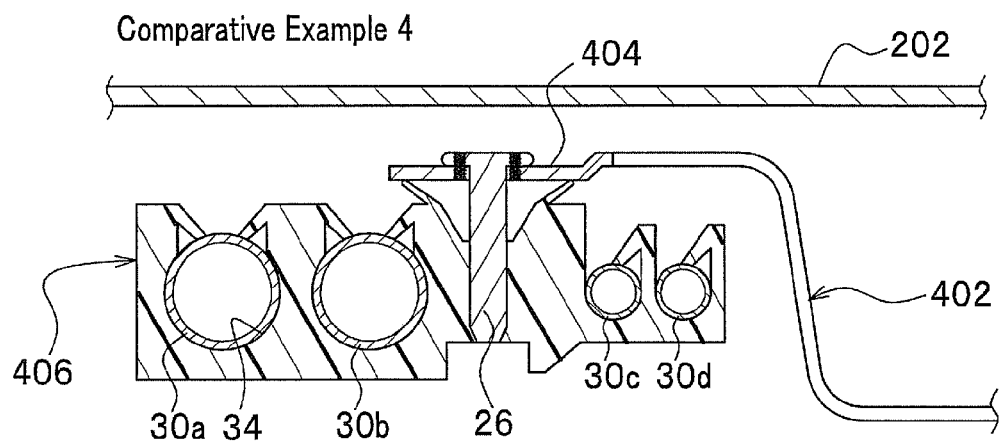
FIG. 11 is a longitudinal sectional view of a piping installation structure according to a Comparative Example 4.
Figure 12:
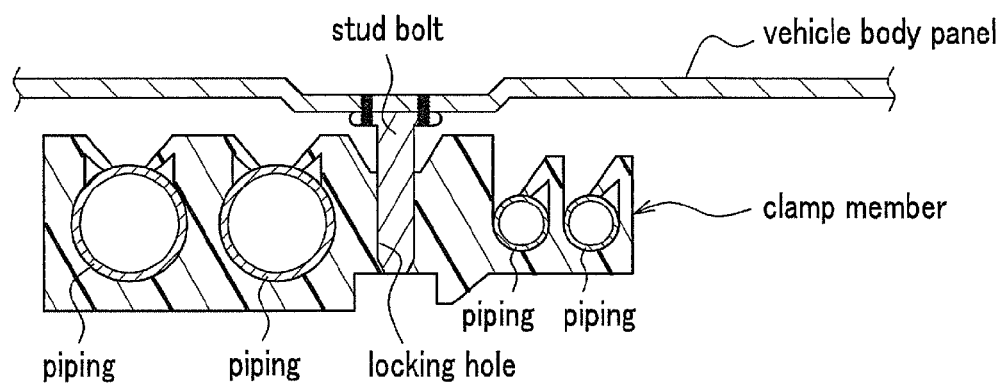
FIG. 12 is a longitudinal sectional view of a prior art piping installation structure.

FIG. 11 is a longitudinal sectional view of a piping installation structure according to Comparative Example 4. In Comparative Example 4, a protrusion 404 extending from a flange portion of a frame member 402 toward the center of the vehicle body by a predetermined length, is disposed along the frame member 402 at a middle portion thereof when seen from the above. To the protrusion 404, a clamp member 406 having the holding grooves 34 and the like for holding the piping 30a-30d is fixed by the stud bolt 26. In this piping installation structure according to Comparative Example 4, by providing the protrusion 404 to the frame member 402, process yield of the material becomes poor and production cost becomes high. Also, because the stiffness of the frame member 402 including the protrusion 404 depends on a plate thickness of the frame member 402, an improvement in stiffness of the piping installation part is limited, and thus the configuration of Comparative Example 4 is not preferred.

In contrast with Comparative Examples 1-4, in the first embodiment, as shown in FIG. 2, the opening 18 of the frame member 16 having an approximately U-shaped cross section is closed with the bracket 22 to form a closed cross section (a box shape having a rectangular cross section). With this configuration, the stiffness of the bracket 22 can be further improved as compared with the prior art. As a result, the stiffness of the piping installation part can be remarkably improved.

That is, in the case of an unclosed cross section structure in which the opening 18 of the frame member 16 is not closed with the bracket 22, because the bracket 22 is supported only by the flange portion 16c of the frame member 16 (cantilever structure), the stiffness of the bracket 22 is insufficient and thus the stiffness of the piping installation part decreases. In contrast, in the first embodiment, joints are made between the bracket 22 and the sidewall portion 16a of the frame member 16, and also between the bracket 22 and the flange portion 16c, to form the rectangular cross section in a box shape. With this configuration in which the bracket 22 is supported by a double supported structure, vibration transmitted to the bracket 22 is dispersed and suppressed, and the stiffness of the piping installation part can be increased.

Figure 3A:
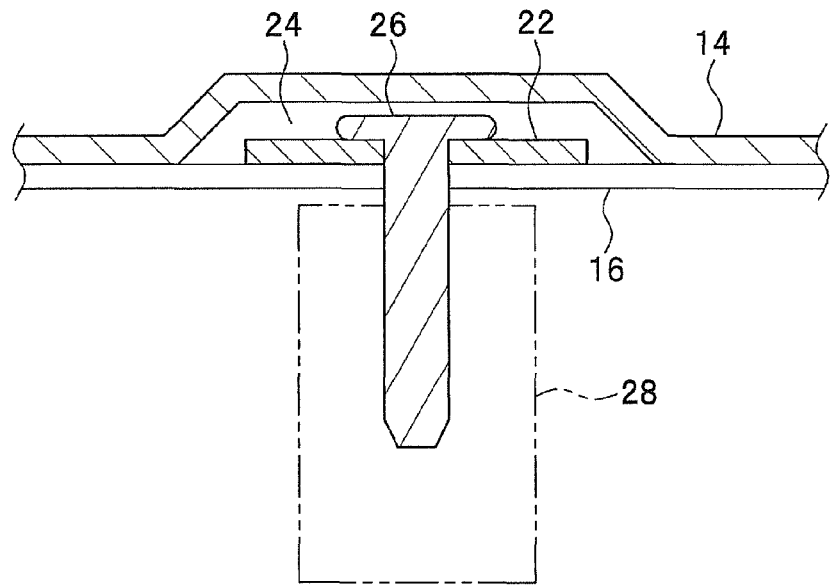
FIG. 3A is a longitudinal sectional view taken along the line Y-Y in FIG. 2.
Figure 3B:
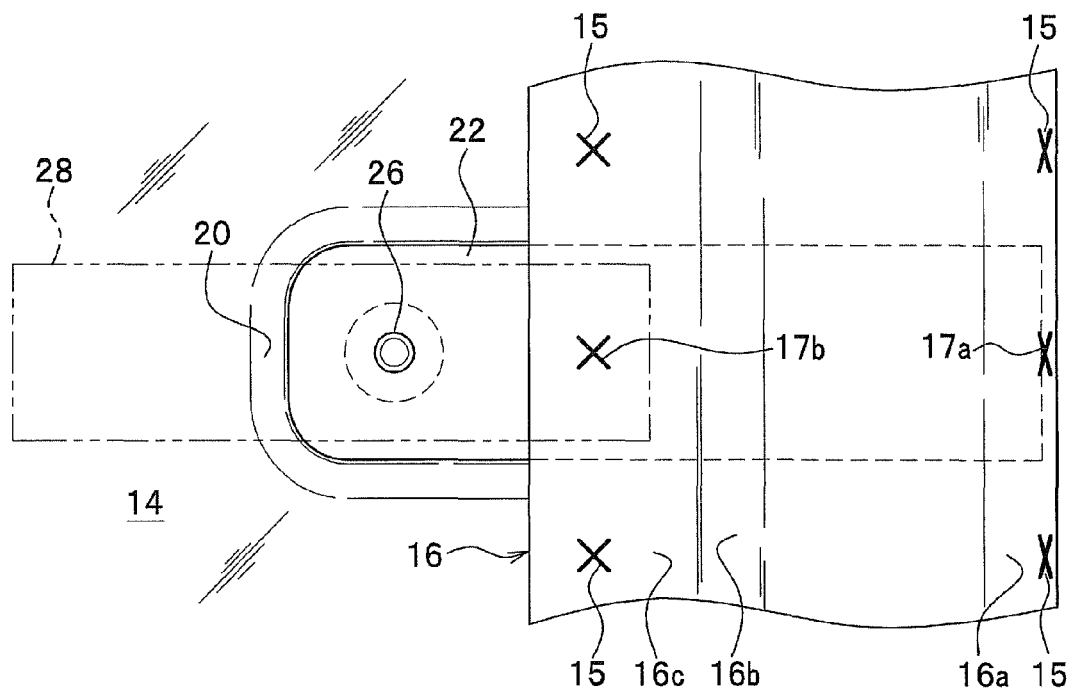
FIG. 3B is a fragmentary view taken in the direction of Z in FIG. 2.

Also, in the first embodiment, between the floor panel 14 and the horizontal portion 22a of the bracket 22, a clearance 24 extending in an approximately horizontal direction and having a predetermined distance in a vertical direction is provided (see FIGS. 2 and 3A). With this configuration, the floor panel 14 and the stud bolt 26 do not contact with each other, and thus vibration and noise generated in the various types of piping 30a-30d are prevented from being directly transmitted to the floor panel 14 via the stud bolt 26.

Figure 4:
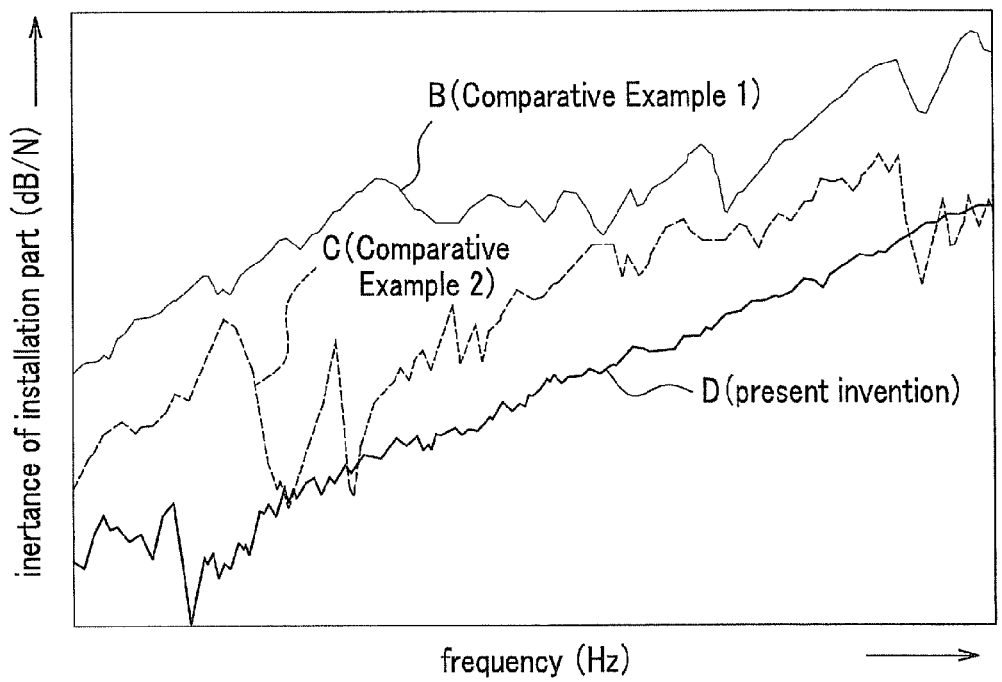
FIG. 4 is a graph showing relationships between frequency and inertance of the installation part in the present invention, Comparative Example 1, and Comparative Example 2.

FIG. 4 is a graph showing relationships between frequency (Hz) and inertance of installation part (Inertance) (dB/N). As is apparent from FIG. 4, as compared with a characteristic curve B of the piping installation structure according to Comparative Example 1 and a characteristic curve C of the piping installation structure according to Comparative Example 2, a characteristic curve D according to the first embodiment shows the lowest inertance of the installation part over a broad frequency band. The result indicates that, in the first embodiment, the stiffness of the installation part (bracket 22) for the piping 30a-30d is high. Herein, the term "inertance" means a relationship (A/F) between a periodical exciting force (F) applied to an elastic piece and an acceleration (A) caused at another point when the force is applied.

Figure 5:
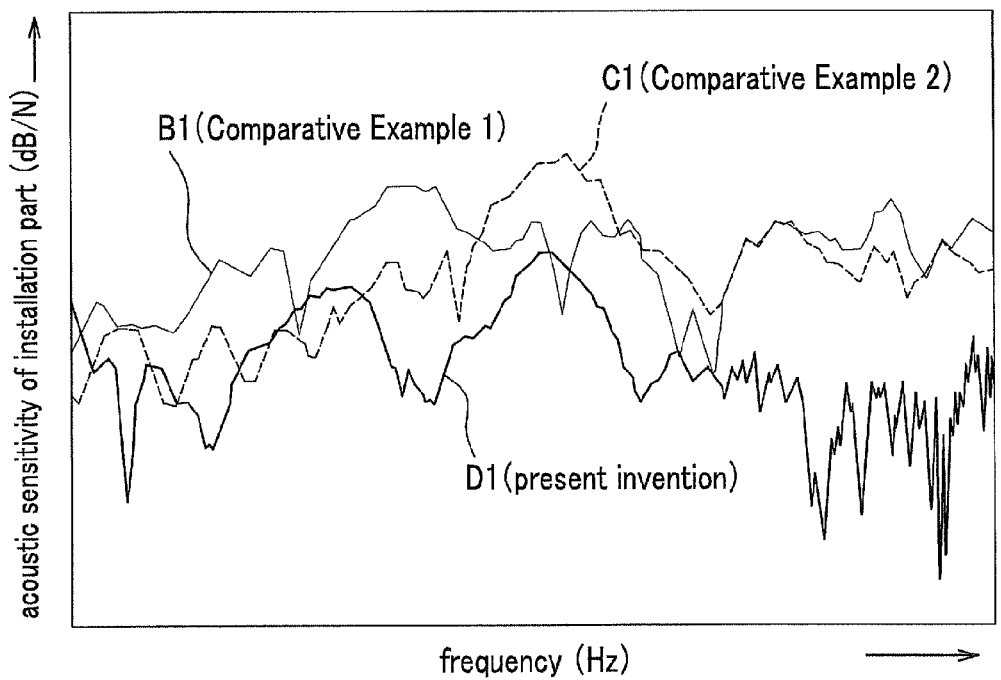
FIG. 5 is a graph showing relationships between frequency and acoustic sensitivity of the installation part in the prevent invention, Comparative Example 1, and Comparative Example 2.

Also, FIG. 5 is a graph showing relationships between frequency (Hz) and acoustic sensitivity of installation part (dB/N). As is apparent from FIG. 5, as compared with a characteristic curve B1 of the piping installation structure according to Comparative Example 1 and a characteristic curve C1 of the piping installation structure according to Comparative Example 2, a characteristic curve D1 according to the first embodiment shows the largest suppression of acoustic sensitivity to the vehicle interior (vehicle compartment), even if the frequency is increased. The result indicates that, in the first embodiment, vibration occurred at the piping installation part (bracket 22) is suppressed and acoustic sensitivity to the vehicle compartment is low. Herein, the term "acoustic sensitivity" means a tendency of a point to generate sound when the point is excited, which is represented by a relationship (P/F) between a periodical exciting force (F) applied to the piping installation part (bracket 22) and a sound pressure (P) inside the vehicle generated when the force is applied.

Also, in the first embodiment, the bracket 22 is separate from the frame member 16. Therefore, a layout of the piping 30a-30d becomes easy, and the stiffness of the installation part can be easily adjusted by, for example, increasing or decreasing the plate thickness (dimension in the thickness direction) of the bracket 22.

Further, in the first embodiment, the plate thickness of the bracket 22 can be set over a wide range, and therefore, the assembly stiffness (static stiffness), which is required when the clamp member 28 is installed to the stud bolt 26, can be easily ensured. Also, corresponding to a variety of vehicle types, freedom of designing of the bracket 22 can be improved.

Still further, in the first embodiment, the protrusion 404 or the like shown in FIG. 11 is not required. Therefore, as compared with the piping installation structure according to Comparative Example 4, a process yield of the material is excellent. Yet still further, in the first embodiment, the acoustic sensitivity of the installation part is suppressed as described above, and responsiveness (sensitivity) to the vibration of the bracket 22 can be reduced. Therefore, a structure for cutting off the vibration of the clamp member 28 can be simplified, the production cost can be reduced, and the weight of the vehicle body can be decreased.

Second Embodiment

Figure 6:
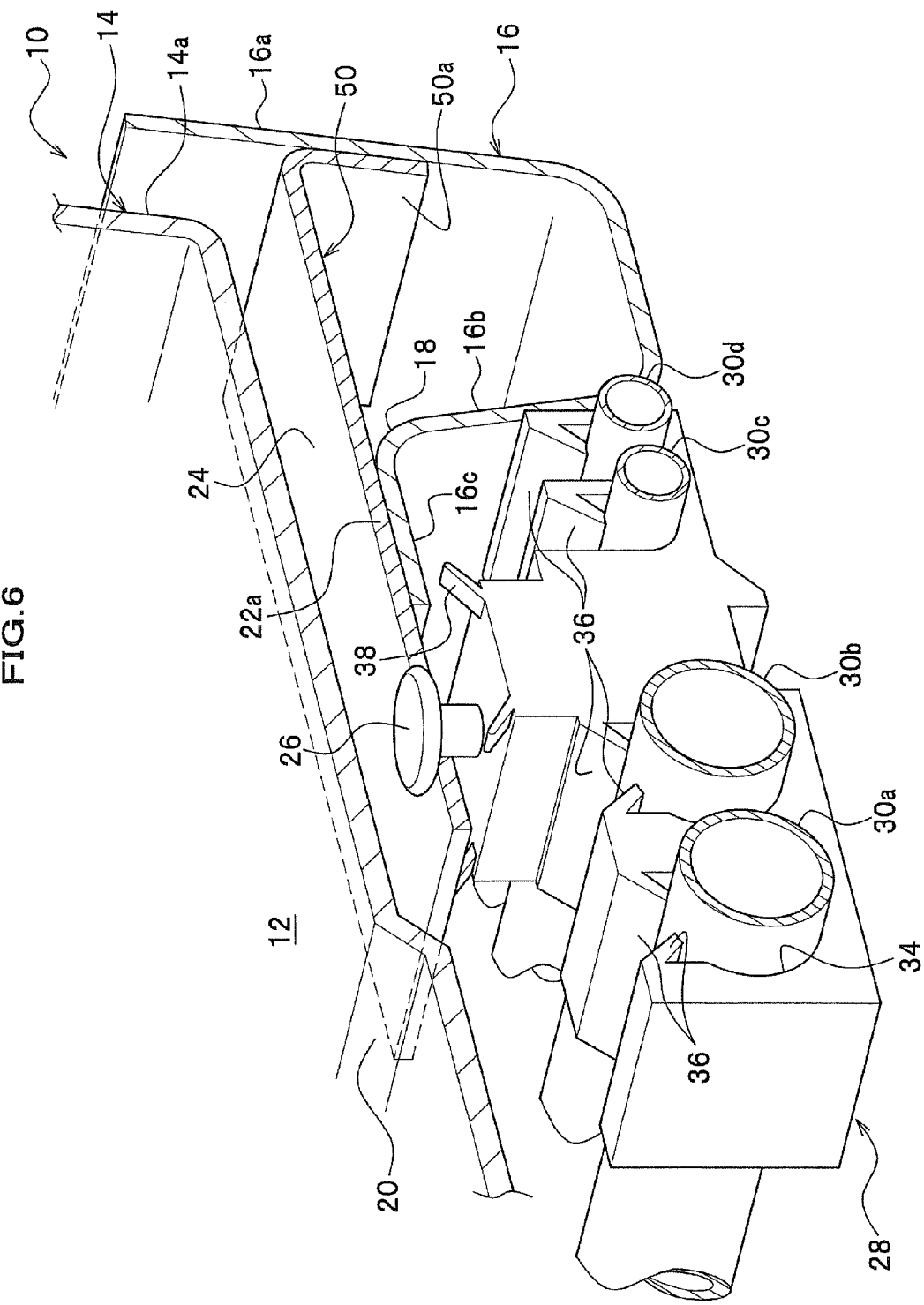
FIG. 6 is a partially cutaway perspective view showing a piping installation structure for a vehicle according to a second embodiment of the present invention.
Figure 7:
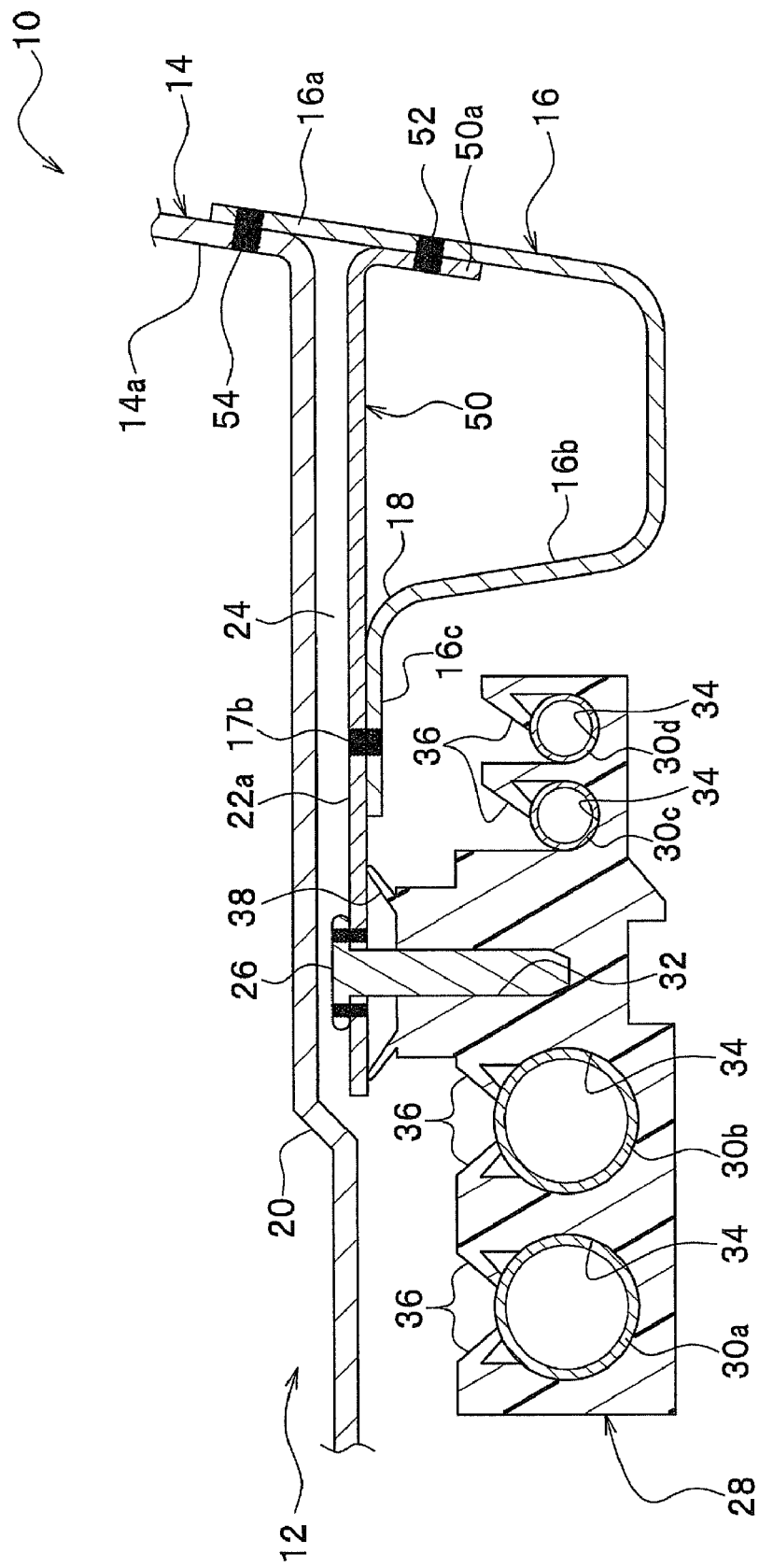
FIG. 7 is a longitudinal sectional view showing the piping installation structure of FIG. 6.

Next, a piping installation structure for a vehicle according to a second embodiment will be described with reference to FIGS. 6 and 7. In addition, components which are the same as those of the first embodiment are designated with the same reference characters, and thus a duplicate description is omitted.

The second embodiment is different from the first embodiment shown in FIGS. 1 and 2 in that, unlike the bracket 22, one end portion of the bracket 50 has a bend portion 50a extending downward and sloping at a predetermined angle along an inner surface of the side wall portion 16a of the frame member 16, and that the bend portion 50a of the bracket 50 is integrally joined only with the frame member 16 at a joint portion 52.

In the second embodiment, for example, by spot welding or the like, an upper portion of the sidewall portion 16a of the frame member 16 is joined with the sidewall portion 14a of the floor panel 14 at a joint portion 54, and a lower portion of the sidewall portion 16a of the frame member 16 is joined with the bend portion 50a of the bracket 50 at the joint portion 52. In other words, in the second embodiment, two members including the bracket 50 (bend portion 50a) and the frame member 16 (sidewall portion 16a) are integrally joined.

In the second embodiment, a closed cross section in a rectangular shape is formed by the frame member 16 and the bracket 50, like in the first embodiment. Therefore, the stiffness of the installation part can be improved and the acoustic sensitivity of the installation part can be reduced. In addition, other effects are the same as those of the first embodiment, and thus a duplicate description is omitted.

What is claimed is:

1. A piping installation structure for a vehicle which is installed under a floor of a vehicle body and configured to support and fix a long part comprising at least piping, the piping installation structure comprising:
   a clamp member for supporting and fixing the long part;
   a stud for fixing the clamp member under the floor of the vehicle body;
   a stud fixing member to which the stud is fixed; and
   an underfloor structural member installed under the floor of the vehicle body,
   wherein:
   the underfloor structural member has a vertical cross section which is approximately U-shaped as seen in a section taken along a plane extending in a vehicle width direction which is orthogonal to a front-rear axis, the underfloor structural member having an opening therein directed toward the floor,
   the stud fixing member and the underfloor structural member are joined to each other to close the opening of the underfloor structural member, and
   a predetermined clearance is provided between the stud fixing member and a lower surface of the floor of the vehicle body.

2. The piping installation structure according to claim 1, wherein the underfloor structural member is fixed to the vehicle body and the stud fixing member is disposed between the floor of the vehicle body and the underfloor structural member.

3. In a vehicle body having a floor, the improvement comprising a piping installation structure for a vehicle which is installed under the floor of the vehicle body and configured to support and fix a long part comprising at least piping, the piping installation structure comprising:
   a clamp member for supporting and fixing the long part;
   a stud for fixing the clamp member under the floor of the vehicle body;
   a stud fixing member comprising a bracket to which the stud is fixed; and
   an underfloor structural member comprising a frame member installed under the floor of the vehicle body, wherein the bracket and the frame member are joined to each other to form a closed cross sectional shape as viewed in a plane which extends in a vehicle width direction orthogonal to a front-rear direction of the vehicle body.

4. The piping installation structure according to claim 3, wherein a predetermined clearance is provided between the stud fixing member and a lower surface of the floor of the vehicle body.

5. The piping installation structure according to claim 3, wherein the underfloor structural member is fixed to the vehicle body, and the stud fixing member is disposed between the floor of the vehicle body and the underfloor structural member.

6. The piping installation structure according to claim 3, wherein the frame member has two opposed sidewall portions, and wherein the bracket is supported by being joined each of said sidewall portions in a width direction of the vehicle body.

* * * * *